No. 771,429. PATENTED OCT. 4, 1904.
F. C. KLOTZ.
HEATING DEVICE.
APPLICATION FILED DEC. 31, 1903.
NO MODEL.
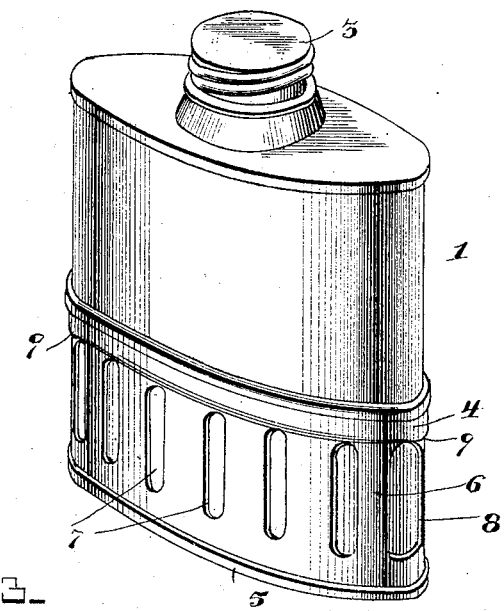
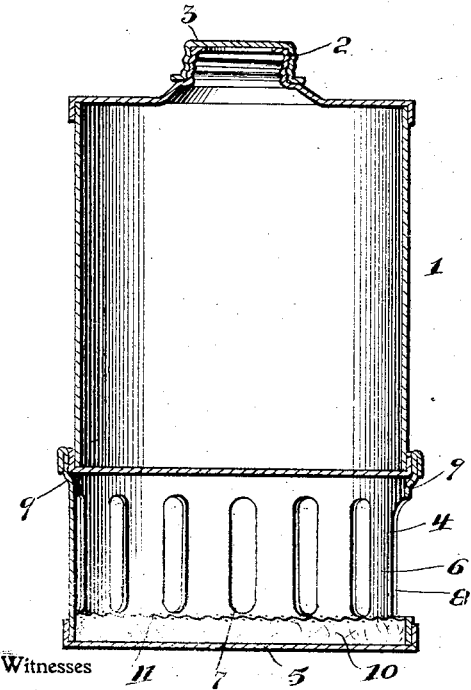
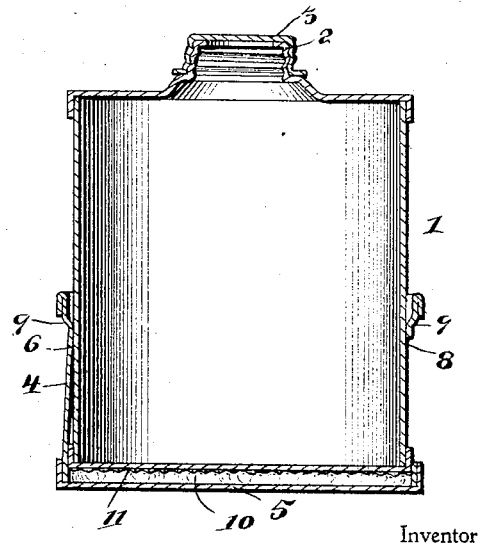
Inventor
F. C. Klotz
Witnesses
By H. B. Willson
Attorney No. 771,429. Patented October 4, 1904.

UNITED STATES PATENT OFFICE.

FREDERICK C. KLOTZ, OF LOUISVILLE, KENTUCKY, ASSIGNOR OF ONE-HALF TO GEO. W. CUSCADEN, SR., OF LOUISVILLE, KENTUCKY.

HEATING DEVICE.

SPECIFICATION forming part of Letters Patent No. 771,429, dated October 4, 1904.

Application filed December 31, 1903. Serial No. 187,355. (No model.)

*To all whom it may concern:*

Be it known that I, FREDERICK C. KLOTZ, a citizen of the United States, residing at Louisville, in the county of Jefferson and State of Kentucky, have invented certain new and useful Improvements in Heating Devices; and I do declare the following to be a full, clear, and exact description of the invention, such as will enable others skilled in the art to which it appertains to make and use the same.

My invention relates to improvements in heating devices or stoves of that class known as "lunch-heaters;" and it comprises a suitable lunch-container having a heater attached thereto.

The object of my invention is to provide a device of this character which will be of simple, durable, and comparatively inexpensive construction and well adapted for the purpose intended.

With this and other objects in view the invention consists of certain novel features of construction, combination, and arrangment of parts, as will be more fully described, and particularly pointed out in the appended claim.

In the accompanying drawings, Figure 1 is a perspective view of my improved heating device in its closed position. Fig. 2 is a vertical sectional view through the same. Fig. 3 is a similar view, the device being in its opened position.

Referring to the drawings by numerals, 1 denotes a receptacle or container in the form of a metal flask or can, preferably oval-shaped in cross-section and provided at its top with an externally-screw-threaded neck 2, the opening in which is closed by a screw-threaded cap 3. The lower portion of the container is adapted to telescope into a combined base and heater 4, which is similar in shape to the container. The said heater 4 comprises a bottom 5, provided with a surrounding side wall 6, formed with a series of narrow slots or openings 7 and a large opening 8 at one end. The upper portion of the wall 6 is bent to form a surrounding inwardly-projecting shoulder 9, which is adapted to engage and support the bottom of the container, as shown in Fig. 3. The shoulder or rib 9 being formed at the upper ends of the slots or openings 7 and 8 is more or less yielding or resilient and permits the bottom of the container to pass it and telescope into the heater, as seen in Fig. 2, when sufficient downward pressure is exerted upon the container. The burner for the heater comprises a wick in the form of a layer of cotton, asbestos, or other suitable absorbent material 10, placed in the heater upon its bottom 5 and preferably covered by a piece of wire-netting or other reticulated metal 11.

When it is desired to heat the contents of the container or can, the wick 10 is saturated with alcohol or other suitable oil and the container then placed in the heater with its bottom resting upon the shoulder 9. A lighted match is then applied to the end opening 8 of the burner to ignite its saturated wick 10. The openings 7 and 8 provide sufficient air to support combustion, and the flames from the wick strike the bottom of the container, then pass through said openings in the wall of the heater, and surround the sides of the container to quickly heat its contents. After the contents of the container have been sufficiently heated the container is forced down into the heater upon the top of the wick, thereby extinguishing the flame. The blow struck upon the top of the container will force or spring the shoulder 9 outwardly to permit the bottom of the container to pass the same, and it will then frictionally engage the sides of the container to hold the heater upon the same, the perforated diaphragm or wire-netting 11 serving as a stop to limit the inward movement of the receptacle when the parts are telescoped. When the heater is thus telescoped upon the container, the device is materially reduced in size and may be conveniently carried in one's pocket or in a lunch bucket or basket.

While I have shown and described the container as being adapted for containing a liquid or drink—such as coffee, tea, chocolate, or the like—it will be understood that the same may be adapted for containing liquid or solid food or any substance it is desired to heat. The device may be constructed of any suitable material and may be in any desired shape. Various other changes in the form, proportion, and the minor details of construction may be resorted to without departing from the principle or sacrificing any of the advantages of this invention.

From the foregoing description, taken in connection with the accompanying drawings, the construction and operation of the invention will be readily understood without requiring a more extended explanation.

Having thus described my invention, what I claim as new, and desire to secure by Letters Patent, is—

A combined container and heater comprising a receptacle, and a telescoping heater in which said receptacle is fitted to slide, said heater consisting of a casing open at top and formed of a bottom and side walls, the said side walls being sprung outward at their upper ends to form an internal spring-shoulder and having a circumferential series of vertical longitudinal slots below said shoulder, said slots terminating respectively at their upper and lower ends a distance below the shoulder and above the bottom to provide receiving and burner spaces, and a perforate diaphragm covering said burner-space and forming a burner-head coextensive in area with the base of the heater below said slots, said internal spring-shoulder being adapted to engage beneath the bottom of the container or frictionally engage the sides thereof, whereby said receptacle may be supported in said receiving-space above the slots and burner when the device is in use, and the receptacle and heater frictionally connected when telescoped, the said diaphragm serving as a stop to limit the inward movement of the receptacle and the bottom of the container serving to extinguish the flame when the parts are telescoped, substantially as described.

In testimony whereof I have hereunto set my hand in presence of two subscribing witnesses.

FREDERICK C. KLOTZ.

Witnesses:
 JOHN J. DUNN,
 HENRY H. SCHULTE.